United States Patent
Ozanam et al.

(10) Patent No.: US 12,515,440 B2
(45) Date of Patent: Jan. 6, 2026

(54) SOLAR-PROTECTION GLAZED ELEMENT WITH DIFFUSE REFLECTION

(71) Applicant: SAINT-GOBAIN GLASS FRANCE, Courbevoie (FR)

(72) Inventors: Cécile Ozanam, Palaiseau (FR); Patrick Gayout, Villemomble (FR); Yael Bronstein, Paris (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 167 days.

(21) Appl. No.: 18/043,242

(22) PCT Filed: Aug. 10, 2021

(86) PCT No.: PCT/FR2021/051459
§ 371 (c)(1),
(2) Date: Feb. 27, 2023

(87) PCT Pub. No.: WO2022/043627
PCT Pub. Date: Mar. 3, 2022

(65) Prior Publication Data
US 2024/0025155 A1 Jan. 25, 2024

(30) Foreign Application Priority Data
Aug. 28, 2020 (FR) ....................... 2008777

(51) Int. Cl.
*B32B 17/10* (2006.01)
(52) U.S. Cl.
CPC .. *B32B 17/10229* (2013.01); *B32B 17/10036* (2013.01); *B32B 17/1011* (2013.01); *B32B 17/10146* (2013.01); *B32B 17/10201* (2013.01); *B32B 17/10651* (2013.01); *B32B 17/10761* (2013.01); *B32B 2307/418* (2013.01); *B32B 2307/7376* (2023.05)
(58) Field of Classification Search
CPC ........ B32B 17/10229; B32B 17/10036; B32B 17/10146

USPC ........................................... 428/141
See application file for complete search history.

(56) References Cited

U.S. PATENT DOCUMENTS

2013/0299856 A1* 11/2013 Verger ................... B60Q 3/208
438/27
2014/0377580 A1   12/2014 Manz

FOREIGN PATENT DOCUMENTS

| FR | 3 012 363 A1 | 5/2015 | |
| FR | 3047439 A1 * | 8/2017 | ....... B32B 17/10036 |
| WO | WO 2012/104547 A1 | 8/2012 | |
| WO | WO 2014/207171 A1 | 12/2014 | |
| WO | WO 2015/063418 A1 | 5/2015 | |
| WO | WO 2019/110172 A | 6/2019 | |

OTHER PUBLICATIONS

Machine_English_translation_FR_3047439_a1; Alvarez, Verre Feuilleté Decoratif; Aug. 11, 2017; EPO; whole document (Year: 2024).*
International Search Report as issued in International Patent Application No. PCT/FR2021/051459, dated Nov. 11, 2021.

* cited by examiner

*Primary Examiner* — Tahseen Khan
(74) *Attorney, Agent, or Firm* — Pillsbury Winthrop Shaw Pittman LLP

(57) ABSTRACT

A laminated glazing structure includes first and second transparent substrates separated by a lamination interlayer, the first substrate being positioned on the outer side of the laminated glazing structure and the second substrate being arranged on the inner side of the laminated glazing structure, each transparent substrate including two main faces, the laminated glazing structure including a functional coating having solar control properties; at least one absorbing element; at least one microstructured surface, the Rdq of which is at least 0.2°, at least one coating having reflective properties deposited in contact with the microstructured surface; the microstructured surface being arranged between the lamination interlayer and the second transparent substrate, the laminated glazing structure having a light transmission (LT) between 2 and 30%.

23 Claims, No Drawings

SOLAR-PROTECTION GLAZED ELEMENT WITH DIFFUSE REFLECTION

CROSS-REFERENCE TO RELATED APPLICATIONS

This application is the U.S. National Stage of PCT/FR2021/051459, filed Aug. 10, 2021, which in turn claims priority to French patent application number 2008777 filed Aug. 28, 2020. The content of these applications are incorporated herein by reference in their entireties.

The invention relates to solar protection glazings with diffuse reflection. They may for example consist of glass or organic polymeric material. They are capable of being used for any known applications of glazed units, such as for vehicles, in particular automobile roofs, buildings, urban furniture, interior furnishings, display media or projection screens, etc.

Solar protection glazed units should allow a sufficient amount of light to pass while not allowing all of the incident solar radiation to pass in order not to excessively heat the interior of the vehicle or building.

Glazings with diffuse reflection make it possible to obtain a transparent projection screen. Glazings with diffuse reflection have already been used for façades of buildings and also in the automotive field. For example, integrating a screen in a windshield has already been proposed.

Within the context of the invention, a glazing having diffuse reflection properties is an element that gives rise to a specular transmission and a diffuse reflection of radiation incident on the glazed unit. Usually, the reflection is said to be diffuse when radiation incident on the element with a given angle of incidence is reflected by the element in a plurality of directions. On the other hand, the reflection by an element is said to be specular when radiation incident on the element with a given angle of incidence is reflected by the element with an angle of reflection equal to the angle of incidence. Similarly, the transmission through an element is said to be diffuse when radiation incident on the element with a given angle of incidence is transmitted by the element in a plurality of directions, whereas the transmission through an element is said to be specular when radiation incident on the element with a given angle of incidence is transmitted by the element with an angle of transmission equal to the angle of incidence.

A transparent element having diffuse reflection properties is described in patent application WO 2012/104547 A1 in the applicant's name. Specular transmission comes from the fact that two outer substrates have smooth outer main surfaces and are made of materials having substantially the same refractive index. Diffuse reflection comes from the fact that each contact surface between two adjacent layers of different refractive indices is textured. Diffuse reflection has the advantage of not reflecting sharp reflections, which reduces the risk of glare, for example when vehicle headlights are reflected on the glazed unit.

The elements described in the examples have light transmissions between 35 and 77%, which does not correspond to the target sought by the present invention. These elements are not fit for solar protection.

Document FR 3 047 439 A1, in the name of the applicant, describes a decorative laminated glass, comprising two substrates each comprising a microstructured surface and comprising a reflective coating. The laminated glass described does not have any property allowing a screening function, it is used as decorative glass. It does not have any solar protection property. Its light transmission is 34%, which is above the targeted target.

Application WO2015/063418 A1 (FR 3012363) in the name of the applicant describes a transparent layered element, with diffuse reflection. The elements described include a textured surface and comprise an absorbent element which makes it possible to limit the light transmission, and therefore the supply of energy and which makes it possible to increase the contrast of the screen. One of the aims of this description is to increase the clarity of vision through the glazed unit for an observer placed on the darkest side, and thus avoid the perception of haze or "dirty glazing". One of the aims is also to increase the internal reflection (useful) relative to the external reflection (parasitic). This document does not concern solar protection glazed units with low solar factors.

None of the described examples combine the desired optical properties in the present invention (an inner light reflection of greater than 15% with a low light transmission, less than 30%)

Combining a high-performance solar protection function and a screening function is not easy. The solar protection function requires maximizing the external energy reflection which is linked to the external light reflection (LR). Meanwhile, the screening function requires the internal LR/external LR ratio to be maximized.

In addition, a low light transmission (LT) requires an absorption function that is difficult to position without disrupting the other requirements.

Document US 2014/0377580 is known in the field of automotive roofs. It describes solar protection laminated glazed units. It comprises a solar protection layer on the inner face of the outer substrate (face 2), and a heat protection layer on the inner face of the inner substrate (face 4); this layer also has the purpose of reducing light transmission.

Conventionally, the faces of a glazed unit are designated starting from the exterior of the building and by numbering the faces of the substrates from the outside towards the inside of the passenger compartment or of the premises which it equips. This means that the incident sunlight passes through the faces in increasing numerical order. In the case of a laminated glazed unit, all the faces of the transparent substrates are numbered but the faces of the laminating interlayers are not numbered. Face 1 is outside the building and thus constitutes the exterior wall of the glazed unit, face 4 is inside the building and thus constitutes the interior wall of the glazed unit, faces 2 and 3 being in contact with the lamination interlayer.

The glazed unit described in the exemplary embodiment shows high solar protection performance (3% total energy transmission or TET) but the optical properties obtained do not match the target sought for a glazing with a screening function, internal LR is 3%, incompatible with the desired screening function.

Document WO2019/110172 also describes solar control laminated glazed units, especially for automotive roofs. It relates to high thermal performance (total solar transmittance or TST as low as possible) in combination with a light transmission of between 2 and 10% and a constant internal light reflection of less than 6%, or even less than 4%, which is incompatible with a screening function.

The complexity of the current glazed units and the specificity of the glazed units with diffuse reflection for spraying makes it difficult to obtain good thermal performance and a screening function together.

The aim of the invention is therefore to overcome the above-mentioned drawbacks by developing a glazing, in particular a laminated glazed unit structure, that offers both good optical and thermal performance while guaranteeing the desired screening function. The desired optical performances are a light transmission of between 2 and 30%, preferably between 3 and 20% (measured under illuminant A and the 2° CIExyz 1931 observer), an internal light reflection greater than 13%, preferably greater than 20% (measured under illuminant A and the 2° CIExyz 1931 observer) and a solar factor (TST) of less than 32%, preferably less than 29% (measured according to the ISO9050 standard).

In the following description, the term "functional" as used in "functional coating" means "able to act on solar radiation and/or infrared radiation."

The selectivity "S" enables the performance of these glazed units to be evaluated. It corresponds to the ratio of light transmission $TL_{vis}$ in the visible range of the glazed unit to the solar factor SF of the glazed unit ($S=TL_{vis}/SF$). Solar factor "SF or g" is understood to mean the ratio in % of the total energy entering the premises through the glazed unit to the incident solar energy.

On the automobile glazed unit market, the performance of the solar control function is indicated by the total solar transmission or "TST" (Total solar transmittance). It is a parameter similar to the factor g but calculated with a different illuminant and other external conditions (convection exchange, etc.). Its calculation is described in the ISO9050 standard.

Known selective glazed units comprise transparent substrates coated with a functional coating comprising a stack of several metallic functional layers, each arranged between two dielectric coatings. These functional coatings are generally obtained by a sequence of depositions carried out by cathode sputtering, optionally assisted by a magnetic field.

The present invention relates to a laminated glazed unit structure comprising at least two transparent substrates separated by a lamination interlayer, the first substrate being positioned on the outer side of the glazed unit structure and the second substrate being arranged on the inner side of the glazed unit structure, each substrate comprising two main faces, characterized in that it comprises:
- a functional coating having solar control properties;
- at least one absorbing element;
- at least one microstructured surface, the Rdq of which is at least 0.2°, preferably at least 1°, preferably at least 3°, etc.,
- at least one coating having reflective properties deposited in contact with the microstructured surface;
- the microstructured surface being arranged between the lamination interlayer and the second substrate.

The object of the invention also covers the case where the same coating fulfills the solar control properties and the reflective properties.

"Reflective properties" refers to reflecting at least in the visible spectrum, but the coating may also reflect in higher and/or lower wavelengths.

"Rdq" refers to the root-mean-square slope measured according to the standard ISO 4287.

The method for measuring microstructured surfaces is as follows

Apparatus and Technique Used

The apparatus for measuring the topography of textured glass is a Micromesure 2 station from STIL SA. The station is equipped with a confocal chromatic imaging sensor (CCS PRIMA) for contactless measurement.

The measuring head consists of a contactless Everest K1 confocal chromatic sensor, the characteristics of which are the following:
  Measuring range 1 mm
  Numerical aperture 0.7
  Maximum measurement angle: +/−44°
  5 micron spot size
  Axial resolution: 37 nanometers
  Accuracy: 75 nanometers
Measuring and Extracting the Roughness Parameter Rdq
  Measured surface 2 mm×2 mm
  Sampling pitch 1 micron×1 micron
  Extraction of the roughness parameters (Rdq)
  Data processing software: MOUNTAINS MAP V7.2 from Digital Surf
  Low-pass Gaussian filtering with a cut-off length of 15 microns (filters the microasperities)
  High-pass Gaussian filtering with a cut-off length of 800 µm (filters the ripples);
  Extracting all of the horizontal and vertical profiles from the surface;
  Expression of the parameter Rdq according to ISO 4287 standard on each of these profiles.

According to a particular embodiment of the invention, the absorbing element is arranged, relative to the microstructured surface, toward the outer side of the glazed unit structure.

In particular, the microstructured surface has a Rdq less than 15°, preferably less than 10°.

Preferably, the absorbent element has a minimum absorption of 50%, preferably at minimum 65%.

Preferably, the reflective coating is arranged between two materials that have substantially the same refractive index. Substantially of the same refractive index is understood to mean that the difference between the refractive indices at 550 nm is less than 0.15, preferably less than 0.05 and even more preferably less than 0.015.

Advantageously, the reflective coating has a LR of greater than 5%, preferably of greater than 7% and even more preferably of greater than 10%.

According to one embodiment, the solar-control functional coating is arranged between the first substrate and the lamination interlayer.

According to another embodiment, the functional coating is deposited in contact with the microtextured surface and also constitutes the coating having reflective properties.

Advantageously, the functional coating comprises one or several metallic functional layers, preferably based on silver, each arranged between two dielectric coatings.

According to certain embodiment, the structure further comprises a low-emissivity coating, preferably arranged on the main face of the second substrate, directed toward the inner side of the structure (face 4).

The low-emissivity coating has, in particular, an emissivity of less than 36%, preferably of less than 34%. It may comprise a transparent conductive layer, the thickness of which is between 40 and 70 nm.

The second substrate is preferably a clear glass.

According to certain embodiments, the first substrate is an absorbing element, in particular a tinted glass.

According to other embodiments, the interlayer element is an absorbing element, in particular tinted. It is not excluded for the absorption to be carried out both by the first substrate and by the interlayer element.

The microstructured surface can be obtained for example by one of the following methods: acid depolishing, sandblasting, embossing, laser texturing, or optionally hot printing. Preferably, a method making it possible to obtain a very fine structure is preferred, such as acid depolishing.

The microstructured surface can be produced on the second substrate (face 3 of the laminated structure) or may also consist of a textured film deposited between the lamination interlayer and the second substrate.

The structure according to the invention in particular:
a light transmission of between 2 and 15%, preferably of between 4 and 10%;
a solar factor (TST) between 14 and 32%, preferably between 14% and 29%, still more preferably between 16 and 25%; and
an internal light reflection greater than 14%; preferably greater than 18% and even more preferably greater than 20%.

The substrates of the structure according to the invention may be made of glass, especially soda-lime-silica glass or in polymeric organic material.

Conventionally, the refractive indices are measured at a wavelength of 550 nm.

The following light characteristics are measured using illuminant A at 2° (CIE1931) perpendicular to the glazed unit (unless otherwise indicated):
LT corresponds to light transmission in the visible range in %,
Rext corresponds to the exterior light reflection in the visible range in %, observer on the exterior space side,
Rint corresponds to the interior light reflection in the visible range in %, observer on the interior space side, The following light characteristics are measured using illuminant D65 at 10° (CIE1964) perpendicular to the glazed unit (unless otherwise indicated):
a*T and b*T correspond to the colors in transmission a* and b* in the L*a*b* system,
a*Rext and b*Rext correspond to the colors in reflection a* and b* in the L*a*b* system, observer on the exterior space side,
a*Rint and b*Rint correspond to the colors in reflection a* and b* in the L*a*b* system, observer on the interior space side.

The TST factor corresponds to the total amount of heat transmitted through the glazed unit and is calculated according to ISO 9050 standard. Finally, the emissivity considered here is the normal emissivity at 283K and calculated according to EN 12898 standard.

The functional coating and/or the low-emissivity ("low E") coating are deposited by magnetic-field-assisted cathode sputtering (magnetron method). According to this advantageous embodiment, all the layers of coatings are deposited by magnetic-field-assisted cathode sputtering.

Unless specifically stipulated, the expressions "above" and "below" do not necessarily mean that two layers and/or coatings are positioned in contact with one another. When it is specified that a layer is deposited "in contact" with another layer or with a coating, this means that there cannot be one (or more) layer(s) inserted between these two layers (or layer and coating).

In the present description, unless otherwise indicated, the expression "based on", used to characterize a material or a layer with respect to what it contains, means that the mass fraction of the constituent that it comprises is at least 50%, in particular at least 70%, preferably at least 90%.

Unless otherwise mentioned, the thicknesses mentioned in the present document, without other information, are real or geometrical physical thicknesses denoted and are expressed in nanometers (and not optical thicknesses). As the refractive index is a dimensionless value, it may be considered that the unit of the optical thickness is that chosen for the physical thickness.

According to the invention, a dielectric coating corresponds to a sequence of layers comprising at least one dielectric layer. If a dielectric coating is composed of several dielectric layers, the optical thickness of the dielectric coating corresponds to the sum of the optical thicknesses of the different dielectric layers constituting the dielectric coating.

According to the invention, an absorbing layer that absorbs solar radiation in the visible part of the spectrum is a layer that absorbs certain wavelengths in the visible range. The optical index of an absorbing layer can be broken down into an actual part and an imaginary part. The actual part, n, corresponds to the refractive index. The imaginary part or attenuation factor k is related to the absorption of light by the layer.

According to the invention:
light reflection corresponds to the reflection of solar radiation in the visible part of the spectrum,
light transmission corresponds to the transmission of solar radiation in the visible part of the spectrum,
light absorption corresponds to the absorption of solar radiation in the visible part of the spectrum.

The functional coating may comprise one or several metallic functional layers, preferably based on silver, each arranged between two dielectric coatings. The functional coating may in particular comprise one, two, three or four metallic functional layers. According to these embodiments:
the functional coating comprises at least one silver-based functional metallic layer, or
the functional coating comprises at least two silver-based functional metallic layers, or
the functional coating comprises at least three silver-based functional metallic layers.

The silver-based functional metallic layers comprise at least 95.0%, preferably at least 96.5% and better still at least 98.0% by weight of silver, relative to the weight of the functional layer. Preferably, a silver-based functional metallic layer comprises less than 1.0% by weight of metals other than silver, relative to the weight of the silver-based functional metallic layer.

Preferably, the thicknesses of the functional metallic layers are substantially identical.

The stack may further comprise at least one blocking layer located in contact with a functional metallic layer.

The blocking layers conventionally have the role of protecting the functional layers from possible damage during the deposition of the upper antireflective coating and during a possible high-temperature heat treatment of the annealing, bending and/or tempering type.

The blocking layers are chosen from metallic layers based on a metal or on a metal alloy, metal nitride layers, metal oxide layers and metal oxynitride layers of one or several elements chosen from titanium, nickel, chromium and niobium, such as a layer of Ti, TiN, TiOx, Nb, NbN, Ni, NiN, Cr, CrN, NiCr or NiCrN. When these blocking layers are deposited in the metal, nitride or oxynitride form, these layers can undergo a partial or complete oxidation according to their thickness and the nature of the layers which surround them, for example, during the deposition of the following layer or by oxidation in contact with the underlying layer.

According to advantageous embodiments of the invention, the blocking layer or layers satisfy one or several of the following conditions:
each functional metallic layer is in contact with at least one blocking layer chosen from a blocking underlayer and a blocking overlayer, and/or each functional metallic layer is in contact with a blocking overlayer, and/or the thickness of each blocking layer is at least 0.1 nm, preferably comprised between 0.2 and 2.0 nm.

The dielectric layers of the coatings exhibit the following characteristics, alone or in combination:

they are deposited by magnetic-field-assisted cathode sputtering, they are chosen from oxides or nitrides of one or more elements chosen from titanium, silicon, aluminum, zirconium, tin and zinc, they have a thickness of greater than 2 nm, preferably between 4 and 100 nm.

According to advantageous embodiments of the invention, the dielectric coatings of the functional coatings satisfy one or more of the following conditions:

the dielectric layers may be based on an oxide or on a nitride of one or more elements chosen from silicon, zirconium, titanium, aluminum, tin, zinc, and/or at least one dielectric coating comprises at least one dielectric layer having a barrier function, and/or each dielectric coating comprises at least one dielectric layer having a barrier function, and/or the dielectric layers having a barrier function are based on compounds of silicon and/or aluminum chosen from oxides, such as $SiO_2$ and $Al_2O_3$, silicon nitrides $Si_3N_4$ and AlN, and oxynitrides $SiO_xN_y$ and $AlO_xN_y$, based on zinc and tin oxide, or based on titanium oxide, the dielectric layers having a barrier function are based on compounds of silicon and/or aluminum optionally comprise at least one other element, such as aluminum, hafnium and zirconium, and/or at least one dielectric coating comprises at least one dielectric layer having a stabilizing function, and/or each dielectric coating comprises at least one dielectric layer having a stabilizing function, and/or the dielectric layers having a stabilizing function are preferably based on an oxide chosen from zinc oxide, tin oxide, zirconium oxide or a mixture of at least two of them, and/or the dielectric layers having a stabilizing function are preferably based on crystalline oxide, in particular based on zinc oxide, optionally doped using at least one other element, such as aluminum, and/or each functional layer is above a dielectric coating, the upper layer of which is a dielectric layer having a stabilizing function, preferably based on zinc oxide, and/or below a dielectric coating, the lower layer of which is a dielectric layer having a stabilizing function, preferably based on zinc oxide.

Preferably, each coating comprises at least one dielectric layer consisting of:

an aluminum and or silicon nitride or oxynitride, or a mixed zinc and tin oxide, or a titanium oxide.

These dielectric layers have a thickness:

of less than or equal to 40 nm, of less than or equal to 30 nm or of less than or equal to 25 nm, and/or of greater than or equal to 5 nm, of greater than or equal to 10 nm or of greater than or equal to 15 nm.

The functional coating may optionally comprise an upper protective layer.

The protective layer may be selected from a layer of titanium, zirconium, hafnium, zinc and/or tin, this or these metals being in the metal, oxide or nitride form.

The transparent substrates according to the invention are preferably made of a rigid inorganic material, such as made of glass, or are organic, based on polymers (or made of polymer).

The organic transparent substrates according to the invention can also be made of polymer, and are rigid or flexible. Examples of polymers which are suitable according to the invention comprise, especially:

polyethylene, polyesters, such as polyethylene terephthalate (PET), polybutylene terephthalate (PBT) or polyethylene naphthalate (PEN);

polyacrylates, such as polymethyl methacrylate (PMMA);

polycarbonates;

polyurethanes;

polyamides;

polyimides;

fluorinated polymers, such as fluoroesters, such as ethylene-tetrafluoroethylene (ETFE), polyvinylidene fluoride (PVDF), polychlorotrifluoroethylene (PCTFE), ethylene-chlorotrifluoroethylene (ECTFE), fluorinated ethylene-propylene copolymers (FEP);

photocrosslinkable and/or photopolymerizable resins, such as thiolene, polyurethane, urethane-acrylate, polyester-acrylate resins, and polythiourethanes.

The substrate is preferably a sheet of glass. The glass is preferably of soda-lime-silica type but it can also be a glass of borosilicate or alumino-borosilicate type.

The substrates may undergo a high-temperature heat treatment, such as an annealing, for example by a flash annealing, such as a laser or flame annealing, a tempering and/or a bending. The heat treatment temperature is greater than 400° C., preferably greater than 450° C. and better still greater than 500° C.

According to advantageous embodiments, the laminated glazed unit according to the invention allows especially the following performances to be achieved:

a solar factor TST of less than or equal to 32%, preferably of less than 25%, and/or a light transmission of between 2 and 15%, preferably of between 5 and 10%; and/or a light reflection, interior side, of greater than or equal to 13%, preferably of greater than or equal to 20%; and/or exterior reflection values of a* and b*, by increasing order preferably, between −10 and +5, between −8 and +3, between −6 and 0; and/or interior reflection values of a* and b*, by increasing order preferably, between −10 and +5, between −6 and +5, between −3 and +1; and/or transmission values of a* and b*, by increasing order preferably, −10 and +5, between −8 and +1, between −6 and 0.

The details and advantageous characteristics of the invention emerge from the following nonlimiting examples.

EXAMPLES

Comparative Example 1

A glazing was made with the following elements:

A first clear glass substrate 2 mm thick is intended to be positioned toward the exterior of the passenger compartment. For the solar control properties, a stack of mono Ag thin layers was deposited by magnetron on the face intended to be turned toward the inside of the structure (face 2). The stack comprises a $Si_3N_4$ dielectric layer (52 nm)/a metallic layer of Ag (12.6 nm)/a NiCr blocking layer (7.3 nm)/a Si$_3$N$_4$ dielectric layer (71.2 nm).

A second substrate 2 mm thick, made of tinted glass, the LT of which for a thickness of 4 mm is 10%, is intended to be positioned toward the interior of the passenger compartment. This substrate is textured on its main face turned toward the inside of the structure, such that the Rdq is 4.1° The microtexturing method consists of acid etching of the glass substrate.

The two substrates are laminated in a traditional manner, using an interlayer of the traditional clear PVB type (0.76 mm thick).

Comparative Example 2

The same structure as in example 1 is carried out, with the exception of the lamination interlayer which is replaced by a tinted PVB-type interlayer, the light transmission of which is 28% when it is laminated between two clear panes of glass 2 mm thick.

The thicknesses of the thin layers of the solar control coating are adapted so that the LT of the whole structure remains between 5 and 10% and that the colors remain neutral. The stack comprises: Si$_3$N$_4$ (12.8 nm)/Ag (9.3 nm)/NiCr (0.1 nm)/Si$_3$N$_4$ (50.2 nm).

Comparative Example 3

A glazing was made with the following elements:
A first substrate 2 mm thick, made of tinted glass, the LT of which for a thickness of 4 mm is 10%, is intended to be positioned toward the exterior of the passenger compartment.
For the solar control properties, a stack of mono Ag thin layers was deposited by magnetron on the face intended to be turned toward the inside of the structure (face 2). The stack comprises:
Si$_3$N$_4$ (13.6 nm)/Ag (6.8 nm)/NiCr (5.9 nm)/Si$_3$N$_4$ (52.6 nm).
The second substrate 2 mm thick is made of clear glass. This substrate is textured on its main face turned toward the inside of the structure such that the Rdq is 4.1°. The microtexturing method consists of acid etching of the glass substrate.
The two substrates are laminated in a traditional manner, using an interlayer of the traditional clear PVB type.

Comparative Example 4

The same structure as in comparative example 3 is created.

A stack comprising a low-E layer of ITO (indium Tin Oxide) type 55 nm thick, protected by dielectric coatings, is deposited on the face opposite the microstructured face. The emissivity of the stack is 33%.

The thicknesses of the thin layers of the solar control coating are adapted so that the LT of the whole structure remains between 5 and 10% and that the colors remain neutral.

The stack comprises: Si$_3$N$_4$ (21.4 nm)/Ag (5.9 nm)/NiCr (6.3 nm)/Si$_3$N$_4$ (42.9 nm).

Table 1 below lists the main optical characteristics of the structures obtained according to the comparative examples.

TABLE 1

|  | EX. C1 | Ex C2 | Ex C3 | Ex C4 |
|---|---|---|---|---|
| LT (%) | 8.0 | 7.2 | 10.0 | 10.0 |
| Int LR (%) | 6.6 | 4.3 | 13.7 | 13.3 |
| Ext LR (%) | 44.6 | 15.4 | 7.7 | 7.1 |
| Rdq (°) | 4.1° | 4.1° | 4.1° | 4.1° |
| a* T | −3.2 | −0.5 | −3.3 | −3.4 |
| b* T | 4.9 | −1.9 | −0.4 | −1.1 |
| a*Rext | 0.9 | 1.7 | −1.0 | −0.6 |
| b*Rext | −2.0 | 0.1 | 1.5 | 1.5 |
| a*Rint | −1.3 | 0.0 | 4.4 | 3.8 |
| b*Rint | −1.2 | −0.5 | 1.8 | 3.6 |
| a*Rext 60° | 1.5 | 2.5 | −0.5 | −0.3 |
| b*Rext 60° | −1.2 | 0.2 | 0.4 | 0.4 |
| TST (%) | 17.0 | 24.3 | 30.2 | 23.9 |

The structures created make it possible to maintain a LT between 5 and 10% and neutral colors. However, it is found that the internal LR values are less than 14%, too small to provide a screening function. In these 4 examples, there is no reflective layer on face #3 which effectively limits the achievable inner LR values.

EXAMPLES ACCORDING TO THE INVENTION

Example 1

A glazing was made with the following elements:
A first substrate 2 mm thick, made of tinted glass, the LT of which for a thickness of 4 mm is 10%, is intended to be positioned toward the exterior of the passenger compartment.
For the solar control properties, a stack of thin layers was deposited by magnetron on face 2 (intended to be turned toward the inside of the structure) of this first substrate. The stack comprises:
Si$_3$N$_4$ (26.2 nm)/Ag (5.3 nm)/NiCr (6.2 nm)/Si$_3$N$_4$ (45.5 nm).
A second substrate 2 mm thick, made of clear glass, is intended to be positioned toward the interior of the passenger compartment. This substrate is textured on its main face turned toward the inside of the structure such that the Rdq is 4.1°. The microtexturing method consists of acid etching of the glass substrate.
A layer of titanium oxide (TiO$_2$) 60 nm thick is deposited in a conformed manner on the microtextured surface of the second substrate. The layer has a constant thickness such that it matches the texture of the substrate.
The two substrates are laminated in a traditional manner, using an interlayer of the traditional clear PVB type.

Example 2

The same structure as in example 1 according to the invention is created, with the exception of the lamination interlayer which is replaced by a tinted PVB, the light transmission of which is 28% when it is laminated between two clear panes of glass 2 mm thick.

The thicknesses of the thin layers of the solar control coating are adapted so that the stack comprises:
Si$_3$N$_4$ (55.8 nm)/Ag (5.2 nm)/NiCr (0.1 nm)/Si$_3$N$_4$ (47.4 nm).

Example 3

The same structure as in example 1 according to the invention is created.

A stack comprising a low-E layer of ITO type with a thickness of 55 nm, protected by dielectric coatings, is deposited on the face opposite the microstructured face. The emissivity of the stack is 33%.

The stack of the solar control coating comprises:

$Si_3N_4$ (19.7 nm)/Ag (7.1 nm)/NiCr (4.9 nm)/$Si_3N_4$ (58.0 nm).

Example 4

The same structure as in example 2 according to the invention is created.

A stack comprising a low-E layer of ITO type with a thickness of 55 nm, protected by dielectric coatings, is deposited on the face opposite the microstructured face. The emissivity of the stack is 33%.

The solar control stack comprises:

$Si_3N_4$ (37.8 nm)/Ag (5.2 nm)/NiCr (0.1 nm)/$Si_3N_4$ (45.3 nm).

Example 5

A glazing was made with the following elements:

For the solar control properties, a stack of mono-Ag thin layers was deposited by magnetron on the face 2 of the first substrate 2 mm thick, made of clear glass, intended to be positioned toward the exterior of the passenger compartment. The stack comprises:

$Si_3N_4$ (50.2 nm)/Ag (7.4 nm)/NiCr (7.3 nm)/$Si_3N_4$ (15.1 nm).

The second substrate 2 mm thick is made of clear glass. This substrate is textured on a face such that the Rdq is 4.1°. The microtexturing method consists of acid etching of the glass substrate.

A layer of titanium oxide ($TiO_2$) 60 nm thick is deposited in a conformed manner on the microtextured surface of the second substrate. The layer has a constant thickness such that it matches the texture of the substrate.

A stack comprising a low-E layer of ITO type with a thickness of 55 nm, protected by dielectric coatings, is deposited on the face opposite the microstructured face. The emissivity of the stack is 33%.

The two substrates are laminated in a traditional manner, using a tinted PVB-type interlayer, the light transmission of which is 28% when it is laminated between two clear glasses 2 mm thick.

Example 6

The same structure as in example 5 according to the invention is carried out even with a bi-Ag solar protection coating. The stack comprises:

$Si_3N_4$ (50.4 nm)/Ag (5.5 nm)/NiCr (4.8 nm)/$Si_3N_4$ (27.3 nm)/Ag (6.0 nm)/NiCr (1.4 nm)/$Si_3N_4$ (24.1 nm).

Example 7

The same structure as in example 6 according to the invention is created by replacing the layer of $TiO_2$ with a 60 nm layer of SiZrN.

The stack comprises: $Si_3N_4$ (67.3 nm)/Ag (6.1 nm)/NiCr (3.0 nm)/$Si_3N_4$ (35.2 nm)/Ag (9.8 nm)/NiCr (0.6 nm)/$Si_3N_4$ (42.3 nm).

Example 8

A glazing was made with the following elements:

The first substrate intended to be positioned toward the exterior of the passenger compartment is a tinted glass 2 mm thick, the LT of which for a thickness of 4 mm is 10%.

A stack of mono-Ag thin layers has been deposited by magnetron on the microstructured surface of the second substrate 2 mm thick, made of clear glass (face 3). The stack comprises:

$Si_3N_4$ (37.1 nm)/Ag (7.0 nm)/NiCr (10.2 nm)/$Si_3N_4$ (48.1 nm).

This coating fulfills both the solar control function and the reflective layer function.

The two substrates are laminated in a traditional manner, using an interlayer of the clear PVB type.

Example 9

The same structure as in example 8 is carried out.

For the solar control and reflective layer properties, a bi-Ag stack was used:

$Si_3N_4$ (49.1 nm)/Ag (5.5 nm)/NiCr (8.6 nm)/$Si_3N_4$ (48.4 nm)/Ag (8.9 nm)/NiCr (0.3 nm)/$Si_3N_4$ (37.6 nm).

Results

Table 2 below lists the main optical characteristics of the obtained structures according to the invention.

TABLE 2

|  | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- |
| LT (%) | 8.7 | 6.5 | 9.5 | 6.4 | 6.4 | 5.7 | 7.1 | 6.9 | 5.1 |
| Int LR (%) | 28.3 | 22.0 | 25.0 | 20.1 | 22.0 | 21.6 | 21.8 | 37.6 | 22.9 |
| Ext LR (%) | 7.1 | 4.9 | 7.6 | 4.9 | 25 | 20 | 25 | 6.6 | 7.9 |
| Rdq (°) | 4.1° | 4.1° | 4.1° | 4.1° | 4.1° | 4.1° | 4.1° | 4.1° | 4.1° |
| a* T | −2.7 | 0.0 | −2.6 | 0.2 | 0.7 | 0.4 | 0.2 | −3.7 | −4.3 |
| b* T | −2.1 | −1.9 | 0.3 | −1.6 | −6.0 | −7.8 | −5.4 | −1.9 | −3.7 |
| a*Rext | −0.8 | 0.1 | −1.3 | −0.3 | 3.8 | 4.6 | −0.6 | −0.1 | −0.1 |
| b*Rext | 1.5 | −1.4 | 1.6 | −0.7 | 1.7 | 1.3 | −0.7 | 1.2 | 3.3 |
| a*Rint | −0.7 | −3.3 | −2.3 | −4.4 | −3.6 | −3.7 | −3.2 | 2.1 | 4.0 |
| b*Rint | 5.7 | 2.9 | −1.5 | −0.7 | −1.2 | 0.0 | −0.1 | 5.0 | 3.3 |
| a*Rext 60° | −0.4 | 0.0 | −0.6 | −0.1 | 3.3 | 4.1 | 1.2 | −0.2 | −0.2 |
| b*Rext 60° | 0.4 | −0.6 | 0.3 | −0.6 | 3.5 | 4.3 | −1.1 | 0.5 | 1.5 |
| TST (%) | 29.9 | 30.9 | 23.7 | 24.1 | 18.3 | 17.8 | 18.0 | 28.0 | 27.5 |

It is noted that it has been possible to maintain a LT between 4 and 10% with an internal LR of greater than 20% and neutral colors. The TST solar factor is less than 31%, or even less than 28% and for certain examples close to 18%, which gives very good solar protection in the passenger compartment.

Other variants are of course conceivable, such as tri-Ag solar control layers, other texturing methods, etc. The microtextured surface must not necessarily be carried out on one of the two substrates. It could be provided by a transparent intermediate substrate, located between the second substrate (positioned inside the glazed unit) and the lamination interlayer. In this case, a second lamination interlayer or a glue, resin or another known adhesive may be necessary to mechanically connect the intermediate substrate and the second substrate. The intermediate substrate is generally thinner than the external substrates, without however being limiting.

The transparent intermediate substrate may consist, especially, of transparent polymer, transparent glass, transparent ceramic. When the transparent substrate is made of polymer, it may be rigid or flexible. In a preferred embodiment of the invention, the intermediate substrate consists of a flexible polymer.

The texturing of one of the main surfaces of the transparent substrate may be obtained by any known method of texturing, for example by embossing the surface of the substrate heated beforehand to a temperature at which it can be deformed, in particular by rolling using a roller whose surface has texturing complementary to the texturing to be formed on the substrate; by abrasion by means of particles or abrasive surfaces, in particular by sand blasting; by chemical treatment, especially treatment with acid in the case of a glass substrate; by molding, especially injection molding in the case of a substrate of thermoplastic polymer; or by etching.

The glazed unit does not necessarily need to be transparent.

It is not necessary for the micro-textured structure to be planarized by the lamination interlayer; sol-gel resins or coatings may be used. In the case where the microtextured surface is not planarized by the lamination interlayer, the planarization of the microtextured surface can be ensured by a layer of curable material, deposited on the textured main surface of the reflective layer while being initially in a viscous state suitable for shaping operations. Such a material may be a varnish, a photocrosslinkable and/or photopolymerizable material such as a resin (such as those normally used as adhesives, glues or surface coatings) or a sol-gel material.

The invention claimed is:

1. A laminated glazing structure comprising at least two transparent substrates separated by a lamination interlayer, a first transparent substrate of the at least two transparent substrates being positioned on an outer side of the laminated glazing structure and a second substrate of the at least two transparent substrates being arranged on an inner side of the laminated glazing structure, each transparent substrate comprising two main faces, the laminated glazing structure comprising:
   a functional coating having solar control properties;
   at least one absorbing element;
   at least one microstructured surface having a Rdq of at least 0.2°,
   at least one coating having reflective properties deposited in contact with the microstructured surface;
   the microstructured surface being arranged between the lamination interlayer and the second transparent substrate,
   the laminated glazing structure having a light transmission (LT) between 2 and 30%, and
   the laminated glazing structure having a specular transmission and a diffuse reflection of radiation incident on the laminated glazing structure.

2. The laminated glazing structure according to claim 1, wherein the absorbing element is arranged, relative to the microstructured surface, toward the outer side of the laminated glazing structure.

3. The laminated glazing structure according to claim 1, wherein the microstructured surface has a Rdq of less than 15°.

4. The laminated glazing structure according to claim 1, wherein the absorbent element has a minimum absorption of 50%.

5. The laminated glazing structure according to claim 1, wherein the coating having reflective properties is arranged between two materials having substantially the same refractive index.

6. The laminated glazing structure according to claim 1, wherein the coating having reflective properties has a LR of greater than 5%.

7. The laminated glazing structure according to claim 1, wherein the functional coating having solar control properties is arranged between the first transparent substrate and the lamination interlayer.

8. The laminated glazing structure according to claim 1, wherein the functional coating having solar control properties is deposited in contact with the microstructured surface and also constitutes the coating having reflective properties.

9. The laminated glazing structure according to claim 1, wherein the functional coating having solar control properties comprises one or more metallic functional layers, each arranged between two dielectric coatings.

10. The laminated glazing structure according to claim 9, wherein the functional coating having solar control properties comprises two metallic functional layers.

11. The laminated glazing structure according to claim 9, wherein the one or more metallic functional layers is/are deposited directly on a dielectric coating.

12. The laminated glazing structure according to claim 1, further comprising a low-emissivity coating directed toward the inner side of the laminated glazing structure.

13. The laminated glazing structure according to claim 12, wherein the low-emissivity coating has an emissivity of less than 36%.

14. The laminated glazing structure according to claim 13, wherein the low-emissivity coating comprises a transparent conductive layer having a thickness between 40 and 70 nm.

15. The laminated glazing structure according to claim 1, wherein the second transparent substrate is a clear glass.

16. The laminated glazing structure according to claim 1, wherein the first transparent substrate is an absorbing element.

17. The laminated glazing structure according to claim 1, wherein the lamination interlayer is an absorbing element.

18. The laminated glazing structure according to claim 1, wherein the microstructured surface is obtained by one of the following methods: acid depolishing, sandblasting, embossing, laser texturing.

19. The laminated glazing structure according to claim 1, wherein the microstructured surface consists of a textured film deposited between the lamination interlayer and the second transparent substrate.

20. The laminated glazing structure according to claim 1, wherein the laminated glazing structure has a light transmission of between 3 and 20%.

21. The laminated glazing structure according to claim 1, wherein the laminated glazing structure has a solar factor TST of between 14 and 32%.

22. The laminated glazing structure according to claim 1, wherein an internal light reflection is greater than 14%.

23. The laminated glazing structure according to claim 1, wherein the at least one coating is arranged in contact between two materials that have substantially the same refractive index such that a difference between the refractive indices at 550 nm is less than 0.15.

* * * * *